US008617687B2

(12) United States Patent
McCarville et al.

(10) Patent No.: US 8,617,687 B2
(45) Date of Patent: *Dec. 31, 2013

(54) MULTI-FUNCTIONAL AIRCRAFT STRUCTURES

(75) Inventors: Douglas A. McCarville, Orting, WA (US); Juan C. Guzman, Seattle, WA (US); Daniel M. Rotter, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 673 days.

This patent is subject to a terminal disclaimer.

(21) Appl. No.: 12/534,356

(22) Filed: Aug. 3, 2009

(65) Prior Publication Data

US 2011/0027526 A1 Feb. 3, 2011

(51) Int. Cl.
 B64C 1/00 (2006.01)
 B64C 1/06 (2006.01)
 B64C 3/34 (2006.01)
 B64C 3/18 (2006.01)
 G02B 6/036 (2006.01)

(52) U.S. Cl.
 USPC ............ 428/117; 244/117 R; 244/123.5; 244/123.9; 244/128; 428/116; 428/158; 385/126

(58) Field of Classification Search
 USPC ............ 428/116, 158, 167, 117, 608; 244/123.1, 123.12–123.14, 123.3, 244/123.5, 123.6, 123.8, 123.9, 128; 385/125; 156/293, 294
 See application file for complete search history.

(56) References Cited

U.S. PATENT DOCUMENTS

| 1,987,337 | A | | 1/1935 | Hammerling |
| 2,491,418 | A | | 12/1949 | Schlesman |
| 2,561,756 | A | | 7/1951 | Shook |
| 2,593,714 | A | * | 4/1952 | Robinson ............... 244/123.12 |
| 2,630,472 | A | | 3/1953 | Mcarthur |
| 3,028,292 | A | | 4/1962 | Hisids et al. |
| 3,205,288 | A | | 9/1965 | Bates |
| 3,390,393 | A | * | 6/1968 | Upton ............................ 343/708 |
| 3,421,336 | A | * | 1/1969 | Lichtenberger et al. ....... 62/52.1 |
| 3,530,021 | A | * | 9/1970 | Reichl ............................ 156/206 |
| 3,779,487 | A | * | 12/1973 | Ashton et al. ............... 244/123.5 |
| 3,963,425 | A | * | 6/1976 | Sambrook ...................... 428/608 |

(Continued)

FOREIGN PATENT DOCUMENTS

DE 1949209 A1 4/1971
EP 0215698 A2 3/1987

(Continued)

OTHER PUBLICATIONS

Ko, "The future of sensor and actuator systems", Sensors and Actuators, Elsevier Sequoia S.A. Lausanne, CH vol. 56 No. 1, Aug. 1, 1996, pp. 193-197.

(Continued)

Primary Examiner — Callie Shosho
Assistant Examiner — Nicholas W Jordan
(74) Attorney, Agent, or Firm — Yee & Associates, P.C.

(57) ABSTRACT

A method and apparatus for manufacturing a composite structure. A filler material with a barrier material for a channel in the filler material is formed. A composite material and the filler material with the barrier material are laid up onto a tool in a shape of the composite structure. The composite material and the filler material in the shape of the composite structure are cured.

16 Claims, 11 Drawing Sheets

(56) References Cited

U.S. PATENT DOCUMENTS

| | | | |
|---|---|---|---|
| 3,979,005 A * | 9/1976 | Robinson et al. | 244/135 R |
| 4,019,291 A | 4/1977 | Ernst | |
| 4,053,667 A * | 10/1977 | Smith | 428/116 |
| 4,079,903 A | 3/1978 | Ashton et al. | |
| 4,197,545 A | 4/1980 | Favaloro et al. | |
| 4,510,500 A | 4/1985 | Brune | |
| 4,538,780 A | 9/1985 | Roe | |
| 4,776,907 A | 10/1988 | Massions | |
| 4,792,493 A * | 12/1988 | Bertram et al. | 428/424.8 |
| 5,170,666 A | 12/1992 | Larsen | |
| 5,184,141 A | 2/1993 | Connolly et al. | |
| 5,197,697 A | 3/1993 | Lyloc et al. | |
| 5,222,166 A | 6/1993 | Weltha | |
| 5,242,523 A | 9/1993 | Willden et al. | |
| 5,255,880 A | 10/1993 | Lyloc et al. | |
| 5,268,392 A * | 12/1993 | Bertram | 521/51 |
| 5,271,986 A | 12/1993 | Dublinski et al. | |
| 5,332,178 A | 7/1994 | Williams | |
| 5,348,601 A | 9/1994 | Ray | |
| 5,363,464 A * | 11/1994 | Way et al. | 385/125 |
| 5,403,424 A * | 4/1995 | Ehrat et al. | 156/247 |
| 5,415,504 A | 5/1995 | Wolf et al. | |
| 5,419,139 A * | 5/1995 | Blum et al. | 220/62.17 |
| 5,458,330 A | 10/1995 | Baum | |
| 5,527,414 A | 6/1996 | Dublinski et al. | |
| 5,624,622 A | 4/1997 | Boyce et al. | |
| 5,632,940 A | 5/1997 | Whatley | |
| 5,647,658 A | 7/1997 | Ziadi | |
| 5,854,336 A | 12/1998 | Divone, Sr. et al. | |
| 5,863,635 A | 1/1999 | Childress | |
| 5,958,550 A | 9/1999 | Childress | |
| 6,116,179 A | 9/2000 | Swinbanks et al. | |
| 6,117,376 A | 9/2000 | Merkel | |
| 6,159,414 A | 12/2000 | Tunis, III et al. | |
| 6,187,411 B1 | 2/2001 | Palmer | |
| 6,198,445 B1 | 3/2001 | Alt et al. | |
| 6,450,678 B1 | 9/2002 | Bayersdorfer | |
| 6,458,309 B1 | 10/2002 | Allen et al. | |
| 6,497,190 B1 | 12/2002 | Lewit | |
| 6,510,961 B1 | 1/2003 | Head et al. | |
| 6,529,127 B2 | 3/2003 | Townsend et al. | |
| 6,632,502 B1 | 10/2003 | Allen et al. | |
| 6,638,466 B1 | 10/2003 | Abbott | |
| 6,653,980 B2 | 11/2003 | Ceccom et al. | |
| 6,689,246 B2 | 2/2004 | Hirahara et al. | |
| 6,739,861 B2 | 5/2004 | Cournoyer et al. | |
| 6,755,998 B1 | 6/2004 | Reichard et al. | |
| 6,889,937 B2 | 5/2005 | Simpson et al. | |
| 6,949,282 B2 | 9/2005 | Obeshaw | |
| 6,960,993 B2 | 11/2005 | Mattes et al. | |
| 6,963,728 B2 | 11/2005 | Edwards et al. | |
| 6,999,857 B1 | 2/2006 | Kasper et al. | |
| 7,001,082 B2 | 2/2006 | Morrison | |
| 7,018,217 B2 | 3/2006 | Marshall et al. | |
| 7,063,763 B2 | 6/2006 | Chapman, Jr. | |
| 7,074,474 B2 | 7/2006 | Toi et al. | |
| 7,118,370 B2 | 10/2006 | Willden et al. | |
| 7,159,822 B2 | 1/2007 | Grantham et al. | |
| 7,205,956 B1 | 4/2007 | Sychaleun et al. | |
| 7,207,523 B2 | 4/2007 | Callahan et al. | |
| 7,216,832 B2 | 5/2007 | Simpson et al. | |
| 7,231,180 B2 | 6/2007 | Benson et al. | |
| 7,246,521 B2 | 7/2007 | Kim | |
| 7,263,889 B2 | 9/2007 | Kennedy et al. | |
| 7,268,517 B2 | 9/2007 | Rahmel et al. | |
| 7,276,703 B2 | 10/2007 | Berkcan et al. | |
| 7,277,822 B2 | 10/2007 | Blemel | |
| 7,281,318 B2 | 10/2007 | Marshall et al. | |
| 7,296,769 B2 * | 11/2007 | Hogenson et al. | 244/171.7 |
| 7,307,431 B2 | 12/2007 | Safai et al. | |
| 7,343,265 B2 | 3/2008 | Andarawis et al. | |
| 7,349,225 B1 | 3/2008 | Bennett | |
| 7,400,253 B2 | 7/2008 | Cohen | |
| 7,419,627 B2 | 9/2008 | Sheu et al. | |
| 7,513,769 B2 | 4/2009 | Benson et al. | |
| 7,719,416 B2 | 5/2010 | Arms et al. | |
| 7,749,421 B2 | 7/2010 | Callis et al. | |
| 7,830,523 B2 | 11/2010 | Bommer et al. | |
| 7,830,888 B2 | 11/2010 | Donovan | |
| 7,861,969 B2 | 1/2011 | Guzman et al. | |
| 7,864,039 B2 | 1/2011 | Georgeson | |
| 7,871,040 B2 | 1/2011 | Lee et al. | |
| 7,879,276 B2 | 2/2011 | Guzman et al. | |
| 7,963,815 B2 | 6/2011 | Mead | |
| 8,022,793 B2 | 9/2011 | Olson et al. | |
| 8,022,843 B2 | 9/2011 | Mitchell et al. | |
| 8,026,257 B2 | 9/2011 | Degnan et al. | |
| 8,026,857 B2 | 9/2011 | Bommer | |
| 8,042,767 B2 | 10/2011 | Velicki et al. | |
| 8,044,812 B2 | 10/2011 | Harres | |
| 8,083,182 B2 | 12/2011 | Cacciaguerra | |
| 8,098,143 B2 | 1/2012 | Andarawis et al. | |
| 8,100,361 B2 * | 1/2012 | Grauerholz | 244/119 |
| 8,115,448 B2 | 2/2012 | John | |
| 8,128,030 B2 | 3/2012 | Dannenberg | |
| 8,154,402 B2 | 4/2012 | Tayrani et al. | |
| 8,234,924 B2 | 8/2012 | Saxena et al. | |
| 2001/0017336 A1 | 8/2001 | Hirahara et al. | |
| 2002/0011047 A1 | 1/2002 | Obeshaw | |
| 2002/0050925 A1 | 5/2002 | Arms et al. | |
| 2002/0178992 A1 | 12/2002 | Lewit | |
| 2003/0098520 A1 | 5/2003 | Cournoyer et al. | |
| 2003/0192990 A1 | 10/2003 | Simpson et al. | |
| 2003/0216149 A1 | 11/2003 | Edwards et al. | |
| 2004/0048582 A1 | 3/2004 | Mattes et al. | |
| 2004/0051214 A1 | 3/2004 | Sheu et al. | |
| 2004/0150529 A1 | 8/2004 | Benoit et al. | |
| 2004/0166408 A1 | 8/2004 | Anderson et al. | |
| 2005/0003145 A1 | 1/2005 | Toi et al. | |
| 2005/0056362 A1 | 3/2005 | Benson et al. | |
| 2005/0128028 A1 | 6/2005 | Sanchez et al. | |
| 2005/0186994 A1 | 8/2005 | Rahmel et al. | |
| 2005/0211843 A1 | 9/2005 | Simpson et al. | |
| 2005/0213548 A1 | 9/2005 | Benson et al. | |
| 2005/0259919 A1 | 11/2005 | Aldridge et al. | |
| 2006/0226287 A1 | 10/2006 | Grantham et al. | |
| 2007/0046298 A1 | 3/2007 | Safai et al. | |
| 2007/0090294 A1 | 4/2007 | Safai et al. | |
| 2007/0109121 A1 | 5/2007 | Cohen | |
| 2007/0114422 A1 | 5/2007 | Berkcan et al. | |
| 2007/0118335 A1 | 5/2007 | Andarawis et al. | |
| 2007/0145638 A9 | 6/2007 | Mead | |
| 2007/0151375 A1 | 7/2007 | Kennedy et al. | |
| 2007/0176840 A1 | 8/2007 | Pristas et al. | |
| 2008/0036617 A1 | 2/2008 | Arms et al. | |
| 2008/0089087 A1 | 4/2008 | Stoner | |
| 2008/0111024 A1 | 5/2008 | Lee et al. | |
| 2008/0157429 A1 | 7/2008 | Callis et al. | |
| 2008/0185478 A1 | 8/2008 | Dannenberg | |
| 2008/0226876 A1 | 9/2008 | Roth | |
| 2008/0290214 A1 | 11/2008 | Guzman et al. | |
| 2009/0057487 A1 | 3/2009 | Velicki et al. | |
| 2009/0058361 A1 | 3/2009 | John | |
| 2009/0101756 A1 | 4/2009 | Cacciaguerra | |
| 2009/0108211 A1 | 4/2009 | Bommer et al. | |
| 2009/0127393 A1 * | 5/2009 | Guzman et al. | 244/133 |
| 2009/0184625 A1 | 7/2009 | Bommer | |
| 2009/0243895 A1 | 10/2009 | Mitchell et al. | |
| 2009/0325628 A1 | 12/2009 | Becker | |
| 2010/0011865 A1 | 1/2010 | Saxena et al. | |
| 2010/0114383 A1 | 5/2010 | Rosca et al. | |
| 2010/0129589 A1 | 5/2010 | Senibi et al. | |
| 2010/0141377 A1 | 6/2010 | Andarawis et al. | |
| 2010/0176939 A1 | 7/2010 | Harres | |
| 2010/0231382 A1 | 9/2010 | Tayrani et al. | |
| 2010/0318243 A1 * | 12/2010 | Lewis et al. | 428/411.1 |
| 2011/0018686 A1 | 1/2011 | Fahley et al. | |
| 2011/0049935 A1 | 3/2011 | Locher et al. | |
| 2011/0076461 A1 | 3/2011 | Jacob et al. | |
| 2011/0080057 A1 | 4/2011 | Bowman et al. | |
| 2011/0088833 A1 | 4/2011 | Guzman et al. | |
| 2011/0111183 A1 | 5/2011 | Guzman et al. | |
| 2011/0139932 A1 | 6/2011 | Matheson et al. | |
| 2011/0188862 A1 | 8/2011 | Fuss et al. | |

(56) References Cited

U.S. PATENT DOCUMENTS

| | | | |
|---|---|---|---|
| 2011/0250384 A1 | 10/2011 | Sumi et al. | |
| 2011/0254267 A1 | 10/2011 | Marengo | |
| 2012/0175464 A1 | 7/2012 | Brownjohn et al. | |

FOREIGN PATENT DOCUMENTS

| | | | |
|---|---|---|---|
| GB | 1522432 A | 8/1978 | |
| GB | 1522432 A | 8/1978 | |
| JP | 4329125 A | 11/1992 | |
| JP | 2005291708 | 10/2005 | |
| WO | 8601039 A1 | 2/1986 | |
| WO | WO2004102056 | 11/2004 | |
| WO | 2005096571 A1 | 10/2005 | |
| WO | 2005105402 A1 | 11/2005 | |
| WO | WO2005105402 A | 11/2005 | |
| WO | WO2007041256 | 4/2007 | |
| WO | 2008010841 A1 | 1/2008 | |
| WO | WO2008076020 | 6/2008 | |
| WO | WO2009023346 | 2/2009 | |
| WO | WO2009055218 | 4/2009 | |
| WO | 2010040004 A1 | 4/2010 | |
| WO | WO2010065330 | 6/2010 | |
| WO | WO2010144248 | 12/2010 | |
| WO | WO2011011110 | 1/2011 | |
| WO | WO2011016931 | 2/2011 | |

OTHER PUBLICATIONS

PCt Search Report for application PCT/US2010/036130 dated Mar. 1, 2011.
USPTO Final office action for U.S. Appl. No. 11/937,006 dated Jun. 22, 2010.
USPTO Notice of allowance for U.S. Appl. No. 11/937,006 dated Oct. 6, 2010.
U.S. Appl. No. 12/508,281, filed Jul. 23, 2009, Fahley et al.
"How about this? Avionics would go in plane's skin", Electronics, VNU Business Puyblications, New York, US, vol. 60, No. 21, Oct. 15, 1987.
PCT Search Report for application PCT/US2010/036082 dated Nov. 18, 2010.
"Communication and Power through Structural Airframe Stringers for On-board Wireless Sensors", pp. 1-10 retrieved Jun. 18, 2009 from: https://sql-pw-01.nw.nos.boeing.com/structures/StratProjects/bp1_12_18_08/BTEC2009WirelessBusDraft12.17.08.pdf.
U.S. Appl. No. 12/484,151, filed Jun. 12, 2009, Lewis et al.
Greenhalgh et al., "The assessment of novel materials and processes for the impact tolerant design of stiffened composite aerospace structures", Composites: Part A 34, Copyright 2003, pp. 151-161.
O'Brien et al., "Assessment of Composite Delamination Self-Healing via Micro-Encapsulation", Proceedings of American Society for Composites 23rd Technical Conference, Sep. 2008, 18 pages.
USPTO Final Office Action dated Jul. 19, 2010 for U.S. Appl. No. 11/753,482, 14 pages.
USPTO Notice of Allowance dated Sep. 7, 2010 for U.S. Appl. No. 11/753,482, 9 pages.
USPTO Office Action dated May 31, 2011 for U.S. Appl. No. 12/277,483, 34 pages.
USPTO Office Action dated Oct. 31, 2011 for U.S. Appl. No. 13/005,786, 26 pages.
USPTO Office Action dated Nov. 10, 2011 for U.S. Appl. No. 12/508,281, 46 pages.
PCT Search for application PCT/US2010/040668 dated Feb. 17, 2011.
USPTO office action for U.S. Appl. No. 11/937,006 dated Dec. 30, 2009.
USPTO office action for U.S. Appl. No. 11/753,482 dated Mar. 31, 2010.
International Search Report for PCT/US2009/065195 dated Mar. 8, 2010.

Seibert et al., "Applications for PMI foams in aerospace sandwich structures", Reinforced Plastics, Elsevier Advanced Technology, NY, vol. 50, No. 1, Jan 2006, pp. 44-48.
Marasco et al., "Mechanical properties balance in novel Z-pinned sandwich panels: Out-of-Plane properties", Composites Part A: Applied Science and Manufacturing, Elsevier Science Publishers, Amsterdam, NL, vol. 37, No. 2, Feb. 2006, pp. 295-302.
USPTO Notice of Allowance dated Dec. 2, 2010 for U.S. Appl. No. 11/937,006, 4 pages.
USPTO Office Action dated Jan. 4, 2011 for U.S. Appl. No. 12/016,018, 9 pages.
USPTO Office Action dated Jul. 9, 2010 for U.S. Appl. No. 12/016,018, 6 pages.
USPTO Notice of Allowance dated Jun. 27, 2011 for U.S. Appl. No. 12/016,018, 7 pages.
USPTO Office Action dated May 10, 2012 for U.S. Appl. No. 12/976,070, 31 pages.
USPTO Office Action dated May 7, 2012 for U.S. Appl. No. 12/484,151, 38 pages.
USPTO Final Office Action dated May 19, 2012 for U.S. Appl. No. 12/508,281, 43 pages.
USPTO Supplemental Notice of Allowance dated Oct. 13, 2010 for U.S. Appl. No. 11/753,482, 4 pages.
USPTO Final Office Action dated Nov. 2, 2011 for U.S. Appl. No. 12/277,483, 12 pages.
USPTO Office Action dated Feb. 24, 2012 for U.S. Appl. No. 12/277,483, 19 pages.
USPTO Office Action dated Feb. 23, 2010 for U.S. Appl. No. 11/925,622, 19 pages.
USPTO Notice of Allowance dated Jul. 12, 2010 for U.S. Appl. No. 11/925,622, 6 pages.
USPTO Final Office Action dated Jul. 13, 2012 for U.S. Appl. No. 13/005,786, 7 pages.
PCT Search Report dated Apr. 23, 2009 regarding international application No. PCT/US2008/064427, 3 pages.
PCT Search Report dated Jun. 16, 2009 regarding international application No. PCT/US2008/078438, 6 pages.
EPO Search Report dated Jul. 15, 2011 regarding application No. 09756924.8-2124 (PCT/US2009065195), applicant's reference NAM/P116420EP00, applicant The Boeing Company, 8 pages.
Abbasi et al., "Microwave Nondestructive Detection of Longitudinal Cracks in Pipe with U-bend and Prediction of its Location by Signal Processing", Electromagnetic Nondestructive Evaluation, vol. 31, Oct. 2008, pp. 154-161 (Abstract).
Caspers et al., "Waveguide Mode Reflectometry for Obstacle Detection in the LHC Beam Pipe Including Signal Attenuation", Proceedings of the 2003 Particle Accelerator Conference, vol. 4, No. 12, May 2003, pp. 2700-2702.
Hatfield et al., "Electromagnetic Reverberation Characteristics of a Large Transport Aircraft", Naval Surface Warfare Center Dahlgren Division, NSWCDD/TR-93/339, Jul. 1994, 95 pages.
Hladio et al., "A passive wireless displacement sensor for structural health monitoring of civil structures", Proceedings of SPIE Nondestructive Characterization for Composite Materials, Aerospace Engineering, Civil Infrastructure, and Homeland Security 2007 SPIE US, vol. 6531, Apr. 2007, pp. 653114 (Abstract).
Hill et al., "Aperture Excitation of Electrically Large, Lossy Cavities", IEEE Transactions on Electromagnetic Compatibility, vol. 36, No. 3, Aug. 1994, pp. 169-178.
Partridge et al., "Manufacture and Performance of Z-Pinned Composites", Advance Polymeric Materials: Structure Property Relationships, CRC Press, Apr. 2003, pp. 98-137.
Shibata et al., "Experimental study on NDT method using electromagnetic waves", Journal of Materials Processing Technology, vol. 161, No. 1-2, Apr. 2005, pp. 348-352 (Abstract).
Notice of Allowance, dated Feb. 1, 2013, regarding USPTO U.S. Appl. No. 13/005,786, 22 pages.
Notice of Allowance, dated Nov. 7, 2012, regarding USPTO U.S. Appl. No. 12/277,483, 7 pages.
Office Action, dated Dec. 13, 2012, regarding USPTO U.S. Appl. No. 12/484,151, 32 pages.

(56) References Cited

OTHER PUBLICATIONS

Office Action, dated Nov. 7, 2012, regarding USPTO U.S. Appl. No. 12/508,281, 26 pages.
Notice of Allowance, dated Apr. 2, 2013, regarding USPTO U.S. Appl. No. 12/484,151, 27 pages.
Office Action, dated Mar. 1, 2013, regarding USPTO U.S. Appl. No. 12/508,281, 28 pages.
Senibi et al., "Method of Forming a Reinforced Foam-Filled Composite Stringer", USPTO U.S. Appl. No. 13/920,085 and Preliminary Amendment, filed Jun. 18, 2013, 42 pages.

* cited by examiner

MULTI-FUNCTIONAL AIRCRAFT STRUCTURES

BACKGROUND INFORMATION

1. Field

The present disclosure relates generally to structures and, in particular, to structures for use in aircraft. Still more particularly, the present disclosure relates to structures that have multiple functions in an aircraft.

2. Background

The weight of an aircraft is a factor in the operating expense and performance of the aircraft. For example, an aircraft with a lighter weight may consume less fuel and may be able to travel for longer distances, as compared to an aircraft with a greater weight. For example, performance, such as stall speed, maximum range air speed, maximum endurance air speed, rate of climb, maneuvering speed, and other performance factors are related to the weight of an aircraft.

In an effort to reduce weight and improve performance, the commercial aircraft industry has increased the use of composite materials. In this effort, aircraft are being designed and manufactured with greater and greater percentages of composite materials. Some aircraft may have more than 50 percent of their primary structure made from composite materials. Composite materials are used in aircraft to decrease the weight of the aircraft.

This decreased weight may improve payload capacities and fuel efficiencies. Further, composite materials may provide longer service life for various components in an aircraft.

Composite materials may be tough, light-weight materials, created by combining two or more dissimilar components. For example, a composite material may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

Accordingly, it would be advantageous to have a method and apparatus which takes into account one or more of the issues discussed above, as well as possibly other issues.

SUMMARY

In one illustrative embodiment, a method is present for manufacturing a composite structure. A filler material with a barrier material for a channel in the filler material is formed. A composite material and the filler material with the barrier material are laid up onto a tool in a shape of the composite structure. The composite material and the filler material in the shape of the composite structure are cured.

In another illustrative embodiment, an apparatus comprises a composite structure having a first channel, a filler material located in the first channel, and a barrier material associated with walls of a second channel in the filler material.

In yet another illustrative embodiment, an apparatus comprises a composite structure having a channel and a barrier material associated with walls of the channel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

DETAILED DESCRIPTION

Figure 1:
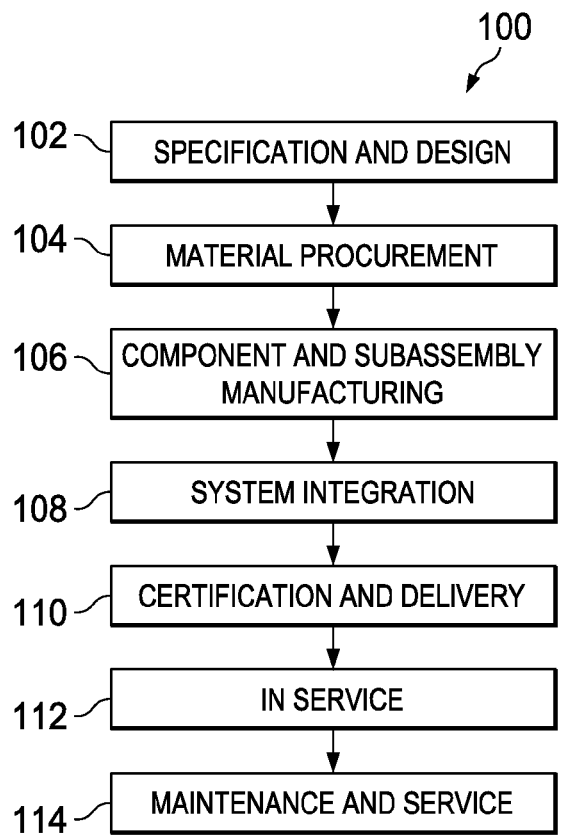
FIG. 1 is an illustration of an aircraft manufacturing and service method in accordance with an illustrative embodiment.
Figure 2:
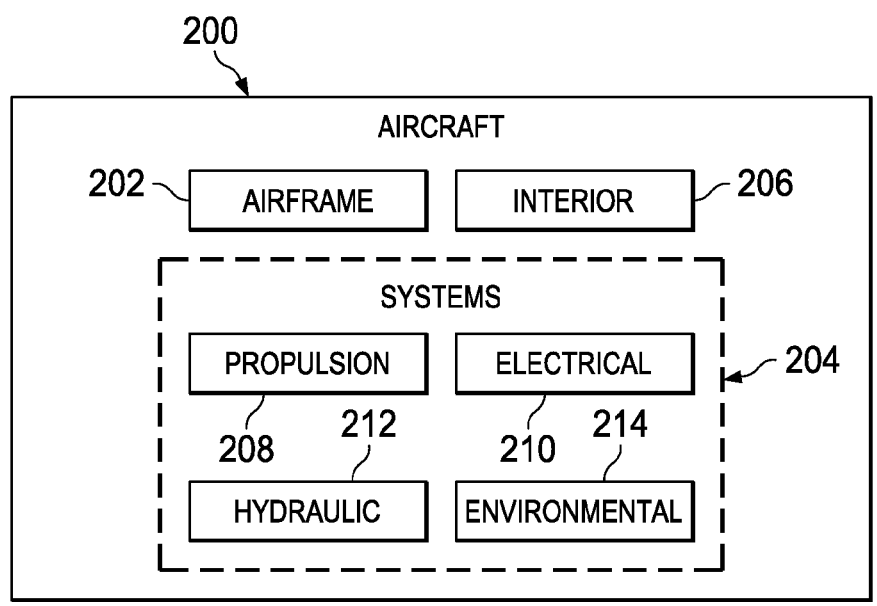
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, a leasing company, a military entity, a service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

In the different illustrative embodiments, composite structures may be used in aircraft 200. These composite structures may reduce the weight of aircraft 200. As a result, aircraft 200 may have increased performance and reduced expenses as compared to other aircraft that do not use composite structures.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A; or item A and item B. This example also may include item A, item B, and item C; or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of, or reduce the cost of, aircraft 200.

The different illustrative embodiments recognize and take into account a number of different considerations. For example, the different illustrative embodiments recognize and take into account that in reducing weight and increasing performance, the number of components that can be changed from metal to composite materials diminishes.

As a result, one or more of the different illustrative embodiments recognize and take into account that alternative weight reduction strategies are needed. The different illustrative embodiments recognize that one strategy may involve using multi-functional structures. For example, composite parts may carry both structural loads and perform other functions.

The different illustrative embodiments also recognize that the current systems used for installing tubing, conduits, and wiring use mechanical components, such as fittings. These fittings are used to secure components to the structure of the aircraft. These systems, however, may require maintenance. Further, the use of fittings also increases the weight of an aircraft.

For example, the different illustrative embodiments recognize and take into account that repeated vibration cycles from takeoffs and landings may cause fittings securing tubing and conduits to become loose and/or fatigued. Fittings, such as C-clamps, may be used to secure a conduit to a structural component.

Access to these fittings may be difficult or unfeasible in some cases. As a result, the fittings are selected to have a configuration to last through the entire lifetime of the aircraft. As a result, these fittings may be heavier than desired. Further, the structural component may need additional strengthening in the areas in which holes may be present for attaching these fittings to the structure of an aircraft.

In addition, in manufacturing an aircraft, the use of fittings may involve the formation of holes in structural components, which requires time and labor. Also, time is needed to install each of the fittings. As a result, the use of fittings in current systems increases the time and expense to manufacture an aircraft.

Thus, a number of the different illustrative embodiments provide a method and apparatus for structures having multiple functions. In one illustrative embodiment, a method is present for manufacturing a composite structure. A filler material is formed with a barrier material for a channel located in the filler material. A composite material and the filler material with the barrier material are laid up onto a tool in the shape of a composite structure. The composite material and the filler material are cured in the shape of the composite structure.

Figure 3:
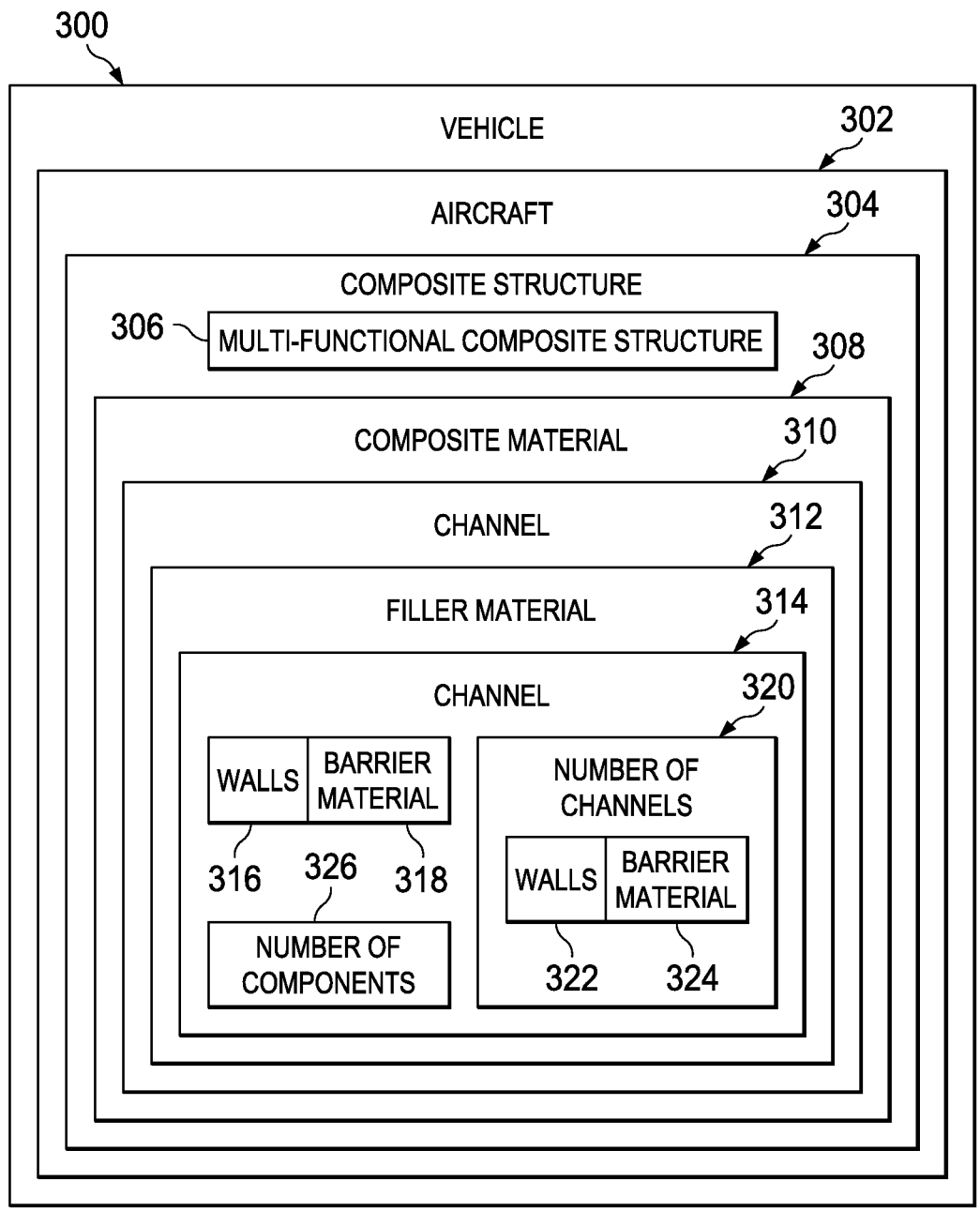
FIG. 3 is an illustration of a vehicle in accordance with an illustrative embodiment.

With reference now to FIG. 3, an illustration of a vehicle is depicted in accordance with an illustrative embodiment. In this example, vehicle 300 may take the form of aircraft 302. Aircraft 302 may be an example of aircraft 200 in FIG. 2.

As illustrated, aircraft 302 may include composite structure 304. Composite structure 304 takes the form of multi-functional composite structure 306 in these illustrative examples. Composite structure 304 may be, for example, without limitation, a spar, a frame, a rib, a fuel tank, a floor panel, a stringer, a cryogenic tank, a dry inter-stage structure, or some other suitable structure.

In this illustrative example, composite structure 304 includes composite material 308. Composite material 308 is in a cured form. Channel 310 is located within composite structure 304. Filler material 312 is present within channel 310. Additionally, channel 314 is present within filler material 312. Channel 314 has walls 316. Barrier material 318 is located in channel 314. In these examples, barrier material 318 is associated with channel 314.

A first component may considered to be associated with a second component by being secured to the second component, bonded to the second component, fastened to the second component, and/or connected to the second component in some other suitable manner. The first component also may be connected to the second component through using a third component. For example, without limitation, the third component may be a tape, a sealant, and/or an adhesive. The first component may also be considered to be associated with the second component by being formed as part of and/or as an extension of the second component.

As one example, barrier material 318 may be adjacent to or contact walls 316 of channel 314. In other examples, barrier material 318 may be part of or form walls 316 for channel 314.

In this illustrative example, composite structure 304 may have a structural function. Additionally, composite structure 304 also may provide a number of other functions through channel 314 with barrier material 318. Barrier material 318 may be configured to provide additional functions in channel 314. In one example, barrier material 318 may form a barrier for channel 314. For example, without limitation, barrier 318 may prevent gas and/or liquids from entering and/or leaving channel 314 though walls 316.

As another illustrative example, barrier material 318 may be used to provide a waveguide in channel 314. In this particular example, barrier material 318 may have a thickness of about 0.0007 inches and may be made of copper. Further, about a 0.5 ounce copper foil may be used for barrier material 318. Barrier material 318 may have other thicknesses in other implementations.

Further, channel 314 with barrier material 318 may hold number of components 326. Number of components 326 may include, for example, without limitation, at least one of wires, cables, insulation, optical fibers, sensors, transmitters, and other suitable components.

In these illustrative examples, filler material 312 may be selected from a number of different types of materials. For example, without limitation, filler material 312 may be at least one of a foam, fiberglass, a vibration-reduction material, a honeycomb structure, an insulation material, wood, and/or other suitable materials.

As another example, barrier material 318 may be selected from one of a metal, copper, aluminum, titanium, a plastic, polyvinyl chloride, and/or other suitable materials. Barrier material 318 may have a thickness selected to provide the desired characteristics for a particular function selected for channel 314 within composite structure 304. As another example, channel 314 may serve as a conduit for air and fluids. For example, channel 314 may function as an air duct, a waveguide, or may be part of a fire suppression system.

Additionally, additional channels, such as number of channels 320, may be present within filler material 312 in these illustrative examples. Number of channels 320 has walls 322 that also may be covered by barrier material 324. Barrier material 324 may be the same material as barrier material 318 or may be a different material in these examples. The material selected may depend on the function for number of channels 320.

As a result, channel 314 may have a different function from number of channels 320. For example, without limitation, channel 314 may be selected to function as a waveguide, while number of channels 320 may be configured to function as an air return or carry fluids. Additionally, different channels within number of channels 320 also may have different functions. As a result, barrier material 324 within number of channels 320 may be different in different channels.

The illustration of composite structure 304 in vehicle 300 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments. For example, in some illustrative embodiments, additional composite structures in addition to composite structure 304 may be present within vehicle 300.

Figure 4:
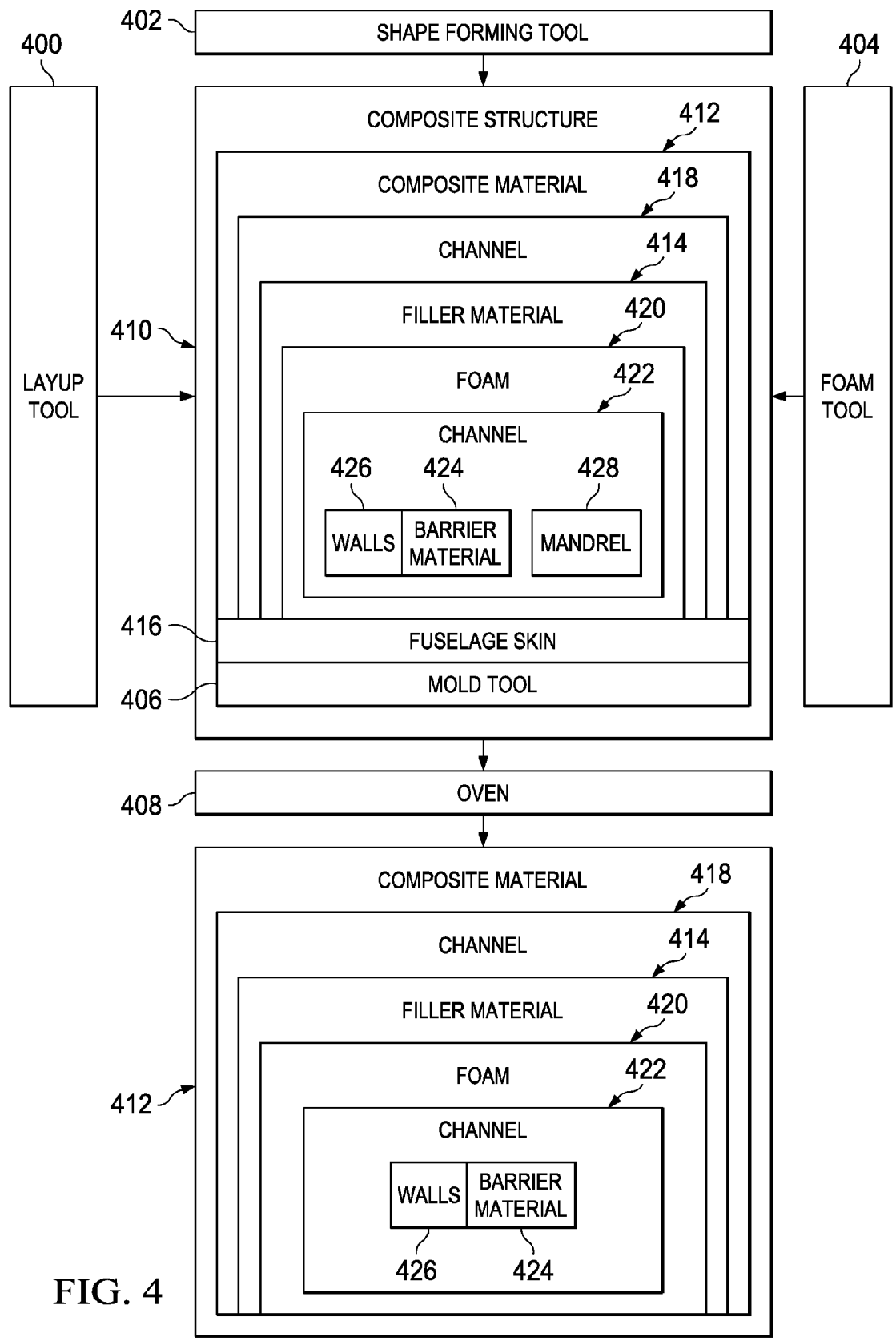
FIG. 4 is an illustration of components used to manufacture a composite structure in accordance with an illustrative embodiment.

With reference now to FIG. 4, an illustration of components used to manufacture a composite structure is depicted in accordance with an illustrative embodiment. In this illustrative example, layup tool 400, shape forming tool 402, foam tool 404, mold tool 406, and oven 408 are used to manufacture composite structure 410.

In this illustrative example, filler material 414 is formed on fuselage skin 416. Filler material 414 is located within channel 418 of composite material 412. Filler material 414, in this illustrative example, is foam 420. Channel 418 may extend all the way through composite structure 410 in this illustrative example. In other illustrative embodiments, channel 418 may only extend partially through composite structure 410. Foam 420 has channel 422 with barrier material 424 located on walls 426 of channel 422. Mandrel 428 is located within channel 422 in these examples.

Composite material 412 may be processed using layup tool 400 and shape forming tool 402. Layup tool 400 is used, in this example, to stack or layup plies of composite material 412 into a number of layers for composite structure 410. This layer also may be referred to as a flat charge. The flat charge is processed by shape forming tool 402 to form the desired shape for composite structure 410. In these examples, composite structure 410 is a composite stringer. The composite stringer may have a hat shape.

Layup tool 400 may be implemented using various composite material processing tools such as, for example, a TORRESLAYUP, which is an automatic tape layer machine available from M. Torres. Another example of a machine that may be used for layup tool 400 is Access-Atlas, which is a composite working machine, available from Forest-Line.

Shape forming tool 402 may be implemented using a machine or a tool that is capable of forming composite material into the desired shape. A forming die or press may be used to implement shape forming tool 402. An example of a press that may be used is a composite spar drape forming machine.

Foam 420, in these illustrative examples, is a foam core located within channel 418. Foam 420 is formed by forming foam tool 404 in these illustrative examples. Foam 420 may be constructed from various materials. In these examples, foam 420 may be a polymer or cellular polymer foam. Foam 420 may be manufactured from a two-phased mixture in which gases, bubbles, or cells are disbursed within a solid polymeric resin. These bubbles or cells may be created through chemical additives. For example, a gas may be created by polymerization reaction or thermal decomposition. These cells also may be created within the resin using physical blowing agents, such as inert gases. Cells created in this manner may be open and loosely interconnected or closed and detached.

When a higher percentage of closed cells are present in a foam, the density of the foam is higher, as well as the weight. In these examples, foam 420 may be made through a number of different methods including, for example, combining blowing agents in liquid resin and then curing the mixture in a mold, through extrusion, compression or injection molding, or solid-state fabrication.

Foam 420 may be implemented with any foam that can remain intact during a curing process. Examples of foams that may be used for foam 420 include, for example, without limitation, Last-A-Foam® containing polyisocyanurate, which is available from General Plastics Manufacturing Company; AirCell containing aromatic polyester, which is available from Polyumac, Inc.; Performa-H® containing polyimide, which is available from GFT Corporation; Corecell™ containing styrene acrylo-nitrile, which is available from Gurit; Rohacell® containing polymethacrylimide, which is available from Evonik Industries AG; Airex® containing polyetherimide, which is available from Alcan Composites; PrimoSpire® containing polyphenylenes, which is available from Solvay Advanced Polymers, L.L.C.; a Liquid Crystalline Polymer Foam containing polyetherether-ketone, which is available from Wright Materials Research Company; Zotek® containing polyvinylidene fluoride, which is available from ZoteFoams plc; Elfoam® containing polyisocyanurate, which is available from Elliott Company; and Divinycell® HT containing polyvinyl chloride, which is available from Diab.

Foam 420 may be formed with mandrel 428 in place in channel 422. Alternatively, mandrel 428 may be inserted into foam 420 after foam 420 is formed. With this example, barrier material 424 may be placed around mandrel 428 and inserted into foam 420.

In some illustrative embodiments, foam 420 may be formed in pieces, such as two halves. Barrier material 424 may be laid onto the pieces of foam 420 with those pieces being placed together around mandrel 428.

Barrier material 424 is associated with walls 426. For example, without limitation, barrier material 424 may be secured to or otherwise associated with walls 426 of channel 422 formed in foam 420 using an adhesive.

In this illustrative embodiment, mandrel 428 is a removable mandrel that is placed into foam 420. Mandrel 428 may have various shapes, depending on the desired shape for channel 422. Mandrel 428 is an elongate member that may be made out of various materials.

Examples of materials for mandrel 428 include, for example, hard silicone rubber, protruded fiberglass, extruded Teflon, aluminum, combinations of these materials, or any other suitable material. Mandrel 428 may be made from any relatively inflexible material that can stay intact within oven 408. Further, mandrel 428 does not need to inflate or swell to introduce pressure to the surface of channel 418.

Composite structure 410 on fuselage skin 416 and mold tool 406 are placed into oven 408 to perform a curing process. Mold tool 406 may be, for example, an inside mold line tool or an outside mold line tool, depending on the implementation. The temperatures in oven 408 may be about 350 degrees Fahrenheit. Additionally, oven 408 also may introduce pressure in performing the curing process for composite structure 410. The pressure may be, for example, about 100 pounds per square inch. The heating causes polymer materials, such as resins, in composite material 412 to flow. When polymers harden, composite structure 410 is considered to be cured in these examples.

Oven 408 may be implemented using any machine that is capable of curing composite components. Oven 408 may take the form of an autoclave in some illustrative examples. An Anchor autoclave from Anchor Autoclave Systems or an autoclave available from Taricco Corporation are examples of autoclaves that may be used to implement oven 408. Composite structure 410 also may be cured using other mechanisms other than oven 408 in other embodiments. For example, electron beam curing may be used to cure composite material 412.

After curing has occurred, composite structure 410 is removed from oven 408, and mandrel 428 is removed from foam 420 to leave channel 422 within foam 420 with barrier material 424 associated with walls 426. In these examples, foam 420 may provide features and advantages as described above with respect to having foam located inside the composite part. Channel 422 within foam 420 aids in reducing weight. The size and configuration of the channel may be selected based on properties and features provided by these configurations.

The illustration of components used to manufacture composite structure 410 in FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in the illustrative example, filler material 414 is illustrated as being foam 420. In other illustrative embodiments, filler material 414 may take other forms. For example, without limitation, filler material 414 may be insulation, a honeycomb structure, wood, or other suitable filler materials. Further, in some illustrative embodiments, mandrel 428 may be unnecessary. For example, if barrier material 424 takes the form of a polyvinyl chloride tube, barrier material 424 may be capable of withstanding pressures and heat during the curing process such that mandrel 428 is unnecessary.

In yet other illustrative embodiments, a number of channels, in addition to channel 422, may be present within channel 418. As a result, multiple channels may provide a capability to provide duplicate or different functions within composite structure 410.

As yet another example, in some illustrative embodiments, a number of components may be present within channel 422 when barrier material 424 has sufficient strength, such that mandrel 428 is not needed for the curing process. These components may be any components capable of functioning after curing has been performed. In yet other illustrative embodiments, the number of components may be placed into channel 422 after curing has occurred. These components are associated with the channel in these examples.

Figure 5:
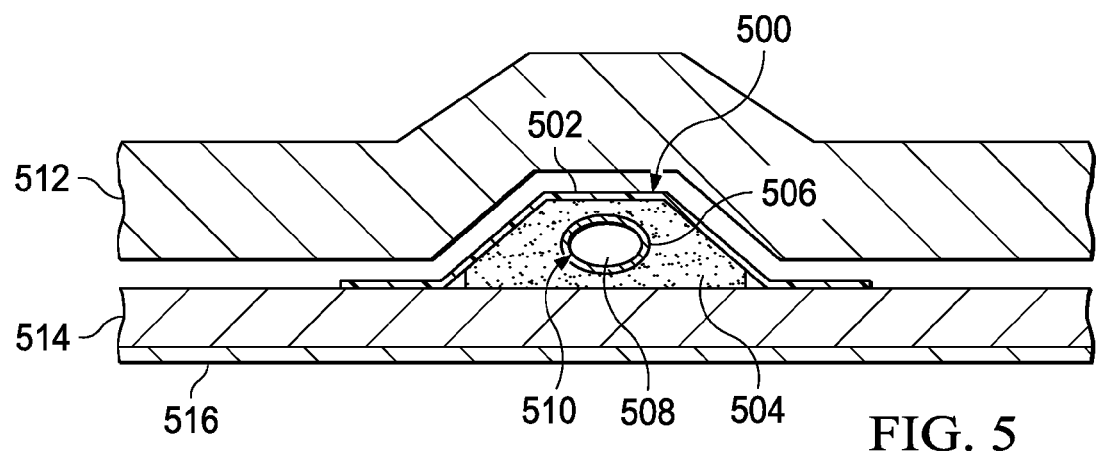
FIG. 5 is an illustration of a layup of composite materials on an inside mold line tool for a composite stringer in accordance with an illustrative embodiment.

With reference now to FIG. 5, an illustration of a layup of composite materials on an inside mold line tool for a composite stringer is depicted in accordance with an illustrative embodiment. In this depicted example, composite stringer 500 is an example of one implementation for composite structure 410 in FIG. 4.

As illustrated, composite stringer 500 includes composite material 502, foam 504, and barrier material 506. Mandrel 508 is located inside channel 510.

Composite material 502 is laid up over foam 504. Foam 504 is placed into inside mold line tool 512. Fuselage skin 514 is placed or laid up onto composite material 502, foam 504, and inside mold line tool 512. Caul plate 516 is placed against fuselage skin 514 in these examples.

In these depicted examples, mandrel 508 is removable. In other illustrative embodiments, mandrel 508 may be unnecessary if barrier material 506 has sufficient strength to withstand the curing process. In yet other illustrative embodiments, channel 510 may be formed later after curing has occurred. Channel 510 may be formed, for example, without limitation, by drilling foam 504 with a drill or other tool. Barrier material 506 may then be associated with channel 510.

Figure 6:
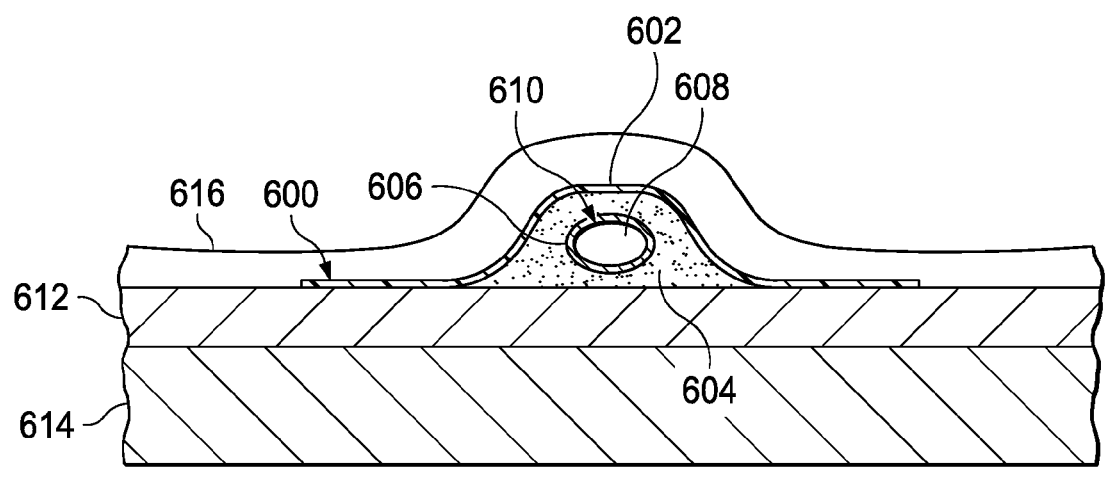
FIG. 6 is an illustration of a layup of composite materials on an outside mold line tool for a composite stringer in accordance with an illustrative embodiment.

Turning now to FIG. 6, an illustration of an example of a layup of composite materials on an outside mold line tool for a composite stringer is depicted in accordance with an illustrative embodiment. In this example, composite stringer 600 is an example of one implementation of composite structure 410 in FIG. 4.

As illustrated, composite stringer 600 includes composite material 602, foam 604, and barrier material 606. Barrier material 606 is associated with channel 608. In this illustrative example, mandrel 610 may be present within channel 608.

Foam 604 is placed on fuselage skin 612. Composite material 602 is placed or laid up over foam 604 and fuselage skin 612. Fuselage skin 612 is located on outside mold line tool 614 in this illustrative example. Composite material 602, foam 604, and barrier material 606 on fuselage skin 612 form composite stringer 600 in a pre-cured state on outside mold line tool 614. In this illustrative example, bag 616 is placed over composite stringer 600 for curing composite stringer 600.

In these depicted examples, although mandrel 610 is present within channel 608, mandrel 610 may be unnecessary. For example, in some illustrative embodiments, barrier material 606 may have sufficient structural rigidity to withstand the curing process. In this instance, barrier material 606 may perform the function of mandrel 610. In yet other illustrative embodiments, channel 608 may be formed after curing of composite stringer 600. With this type of implementation, barrier material 606 is associated with channel 608 after channel 608 is formed. Channel 608 may be formed by drilling the cavity with a drill or other suitable tool.

Figure 7:
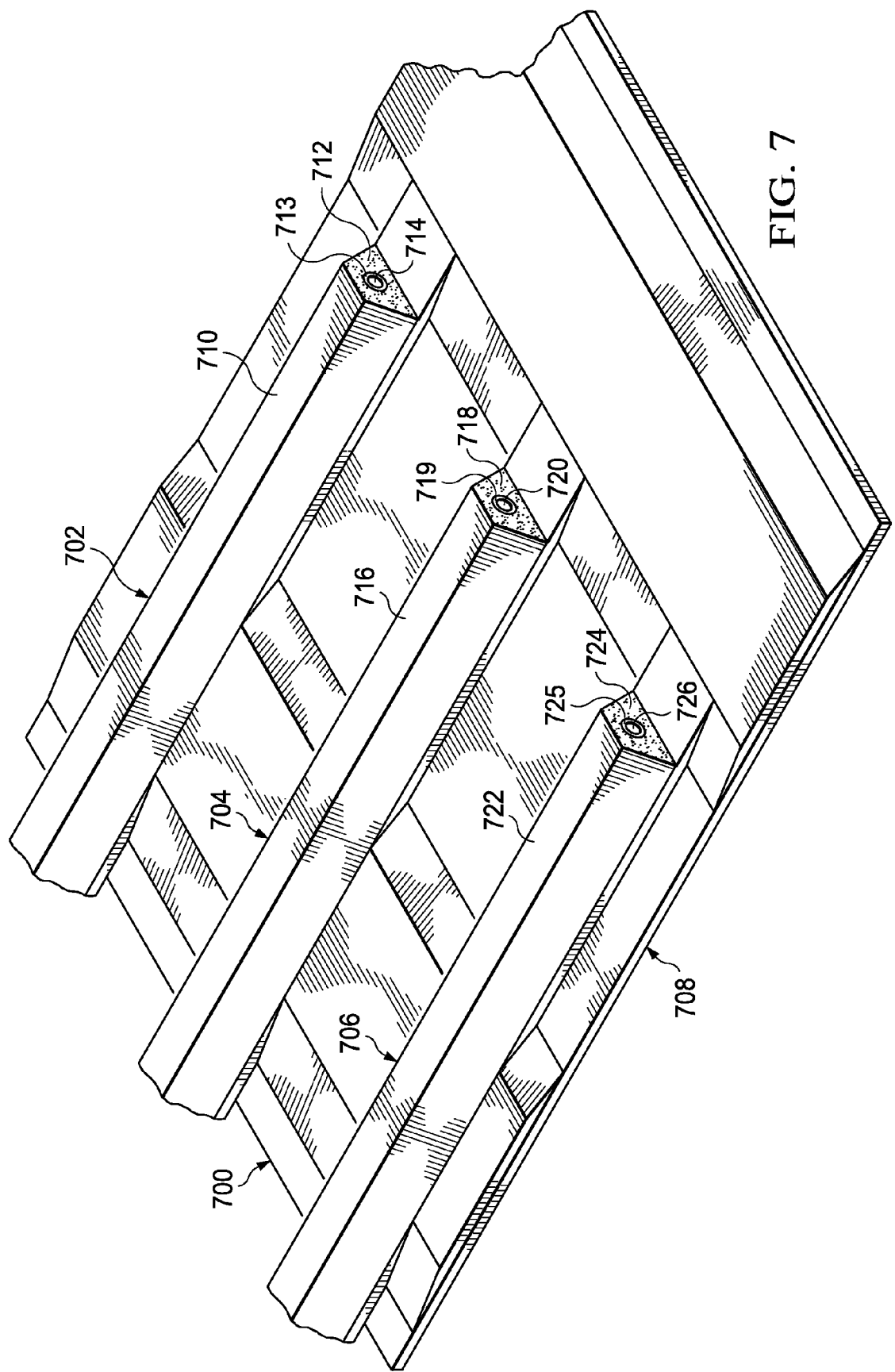
FIG. 7 is an illustration of a perspective view of composite stringers containing foam with hollowed channels or sections in accordance with an illustrative embodiment.

Turning now to FIG. 7, an illustration of a perspective view of composite stringers containing foam with hollowed channels or sections is depicted in accordance with an illustrative embodiment. In this example, assembly 700 includes composite stringers 702, 704, and 706 mounted on fuselage skin 708.

Composite stringer 702 includes composite material 710, foam 712, and barrier material 713 associated with channel 714 being present within foam 712. Composite stringer 704 includes composite material 716, foam 718, and barrier material 719 associated with channel 720 being formed within foam 718. Composite stringer 706 includes composite material 722, foam 724, and barrier material 725 associated with channel 726 in foam 724. The presence of barrier materials 713, 719, and 725 for the walls in the channels configures composite stringers 702, 704, and 706 to be used for additional functions in addition to functioning as a structural component.

Turning next to FIGS. 8-11, illustrations of cross-sections of composite stringers having channels with barriers are depicted in accordance with an illustrative embodiment. The different composite stringers illustrated in FIGS. 8-11 are examples of composite stringers that may be manufactured using an inside mold line tool.

Figure 8:
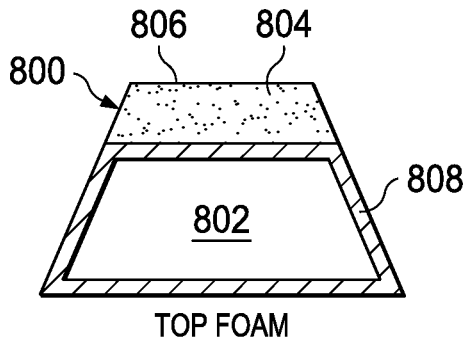
FIGS. 8-11 are illustrations of cross-sections of composite stringers having channels with barriers in accordance with an illustrative embodiment.

First, in FIG. 8, composite stringer 800 has trapezoid-shaped channel 802, in which foam 804 is located at top side 806 of composite stringer 800. Channel 802 has barrier material 808. In this illustrative example, a portion of barrier material 808 is associated with foam 804, while another portion of barrier material 808 is associated with the composite material in composite stringer 800. Of course, in some illustrative embodiments, barrier material 808 may only be associated with the composite material in composite stringer 800. In this type of embodiment, foam 804 may be omitted from composite stringer 800.

Figure 9:
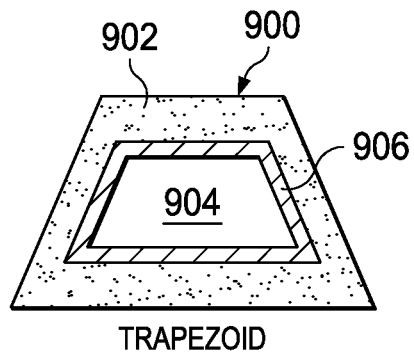
Figure 10:
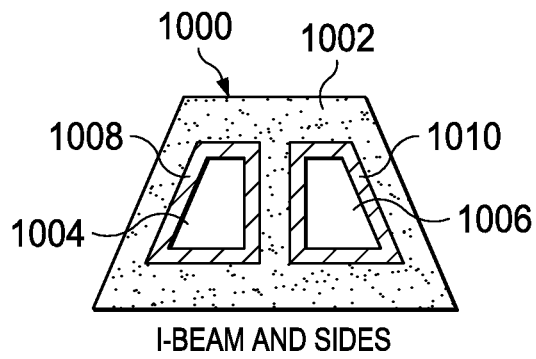
Figure 11:
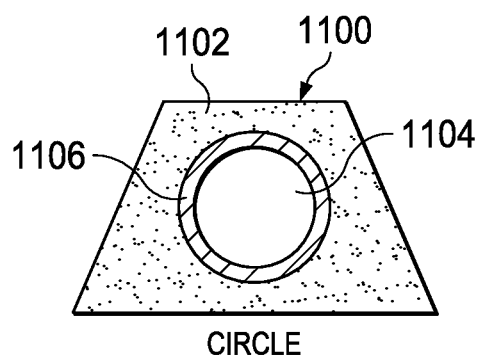

In FIG. 9, composite stringer 900 includes foam 902 in which channel 904 has a trapezoidal shape. Channel 904 has barrier material 906 associated with channel 904. Composite stringer 1000 in FIG. 10 shows foam 1002 in an I-beam configuration with barrier material 1008 in channel 1004 and barrier material 1010 in channel 1006. In FIG. 11, composite stringer 1100 includes foam 1102 with channel 1104 in a circular shape. Channel 1104 has barrier material 1106 in channel 1104.

These depicted cross-sections of composite stringers with foam cores and channels are provided for purposes of illustrating some configurations for the different foam cores and channels. Of course, other configurations may be used, depending on the particular implementation.

Turning now to FIGS. 12-15, illustrations of cross-sections of composite stringers with foam-stiffened hollow cores with different channel configurations are depicted in accordance with an illustrative embodiment. In these examples, cross-sections of stringers are illustrated in which composite stringers are formed using an outside mold line tool.

Figure 12:
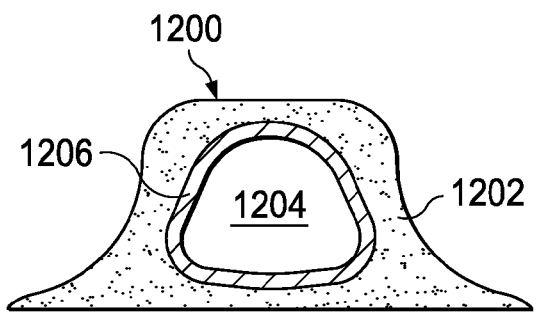
FIGS. 12-15 are illustrations of cross-sections of composite stringers with foam stiffened hollow cores with different channel configurations in accordance with an illustrative embodiment.
Figure 13:
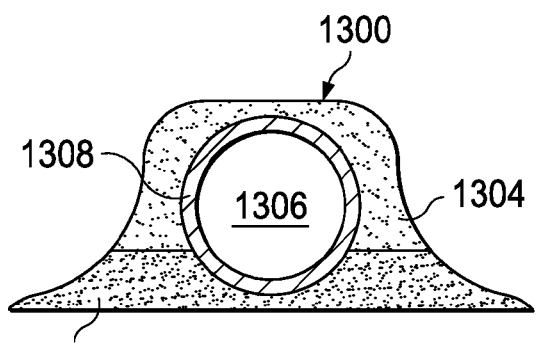

In FIG. 12, composite stringer 1200 includes foam 1202 with barrier material 1206 in channel 1204. In FIG. 13, composite stringer 1300 includes foam 1302 and foam 1304 with channel 1306 and barrier material 1308 in channel 1306. Channel 1306 is a circular-shaped channel. In this example, two types of foam are used within composite stringer 1300.

Figure 14:
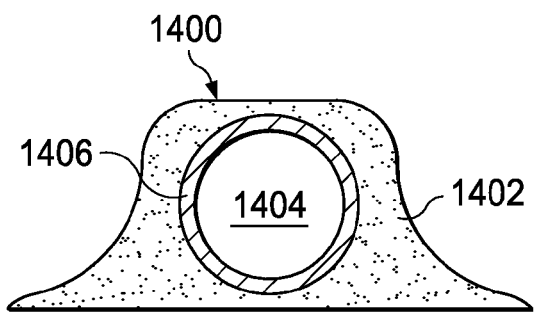
Figure 15:
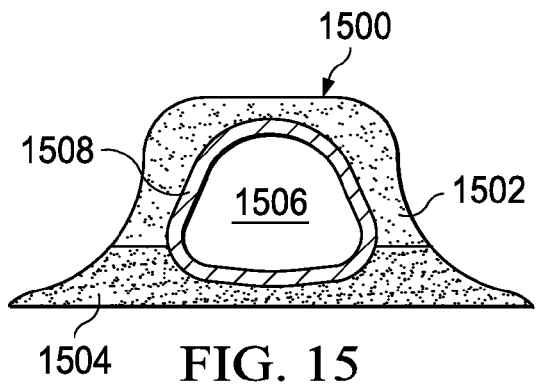

Next, in FIG. 14, composite stringer 1400 includes foam 1402 and circular-shaped channel 1404 with barrier material 1406 in channel 1404. Composite stringer 1500 in FIG. 15 includes foam 1502 and foam 1504 with channel 1506 and barrier material 1508 in channel 1506. In this example, two types of foam also are used within composite stringer 1500.

The illustrations of composite structures in the form of composite stringers in FIGS. 8-15 are not meant to imply structural or architectural limitations to the manner in which other illustrative embodiments may be implemented. The different illustrative embodiments may be applied to other composite structures in addition to composite stringers. For example, without limitation, the different illustrative embodiments may be used with frames, floor panels, and/or other suitable structures.

Figure 16:
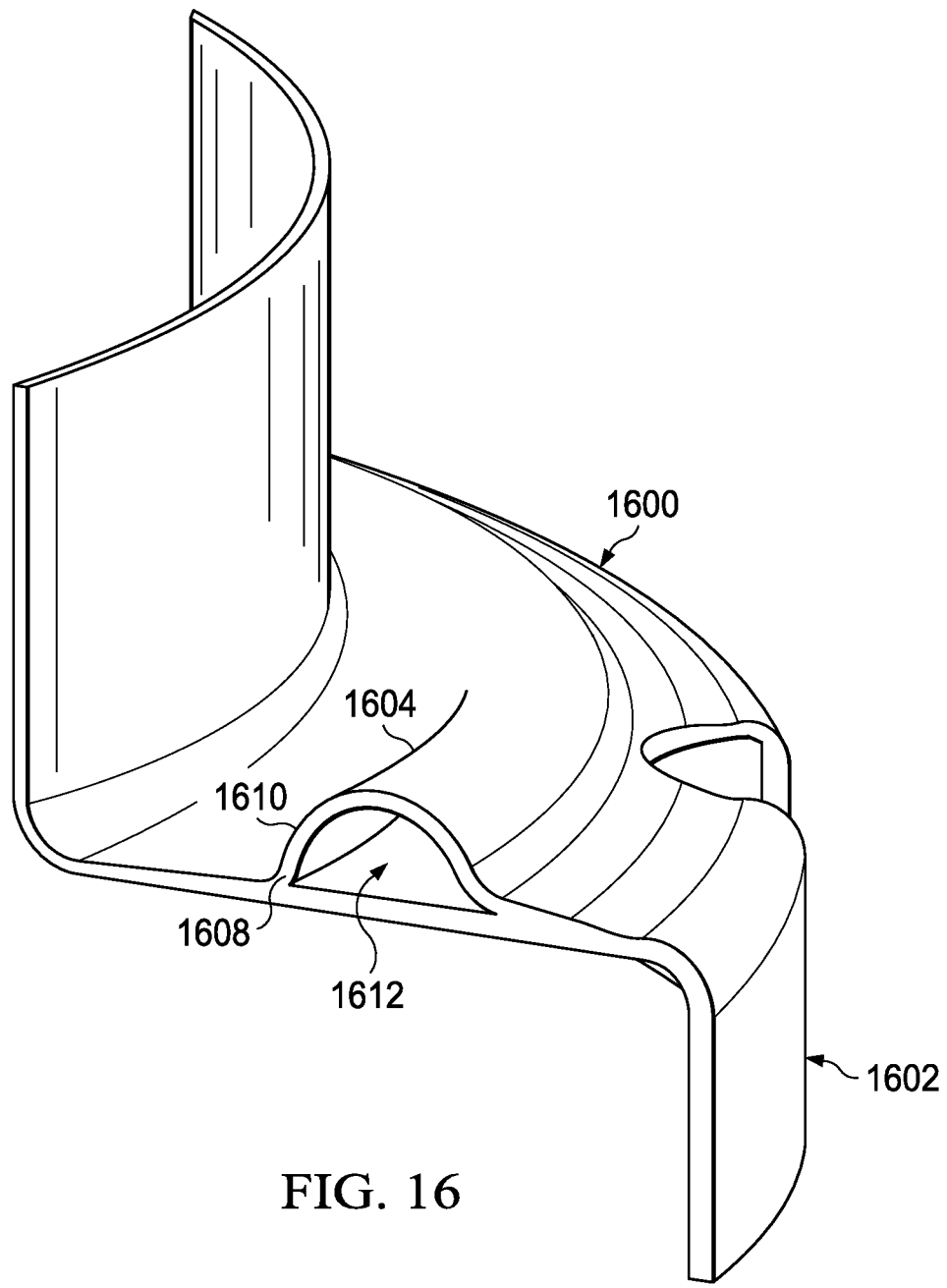
FIG. 16 is an illustration of a composite structure in accordance with an illustrative embodiment.

With reference to FIG. 16, an illustration of a composite structure is depicted in accordance with an illustrative embodiment. In this depicted example, composite structure 1600 takes the form of frame 1602. Frame 1602 comprises composite material 1604. Barrier material 1608 is associated with walls 1610 of channel 1612. In this illustrative example, barrier material 1608 is bonded to walls 1610 of channel 1612. In other illustrative embodiments, barrier material 1608 may be only partially associated with walls 1610. In other words, barrier material 1610 may only be bonded to some portion of walls 1610.

Figure 17:
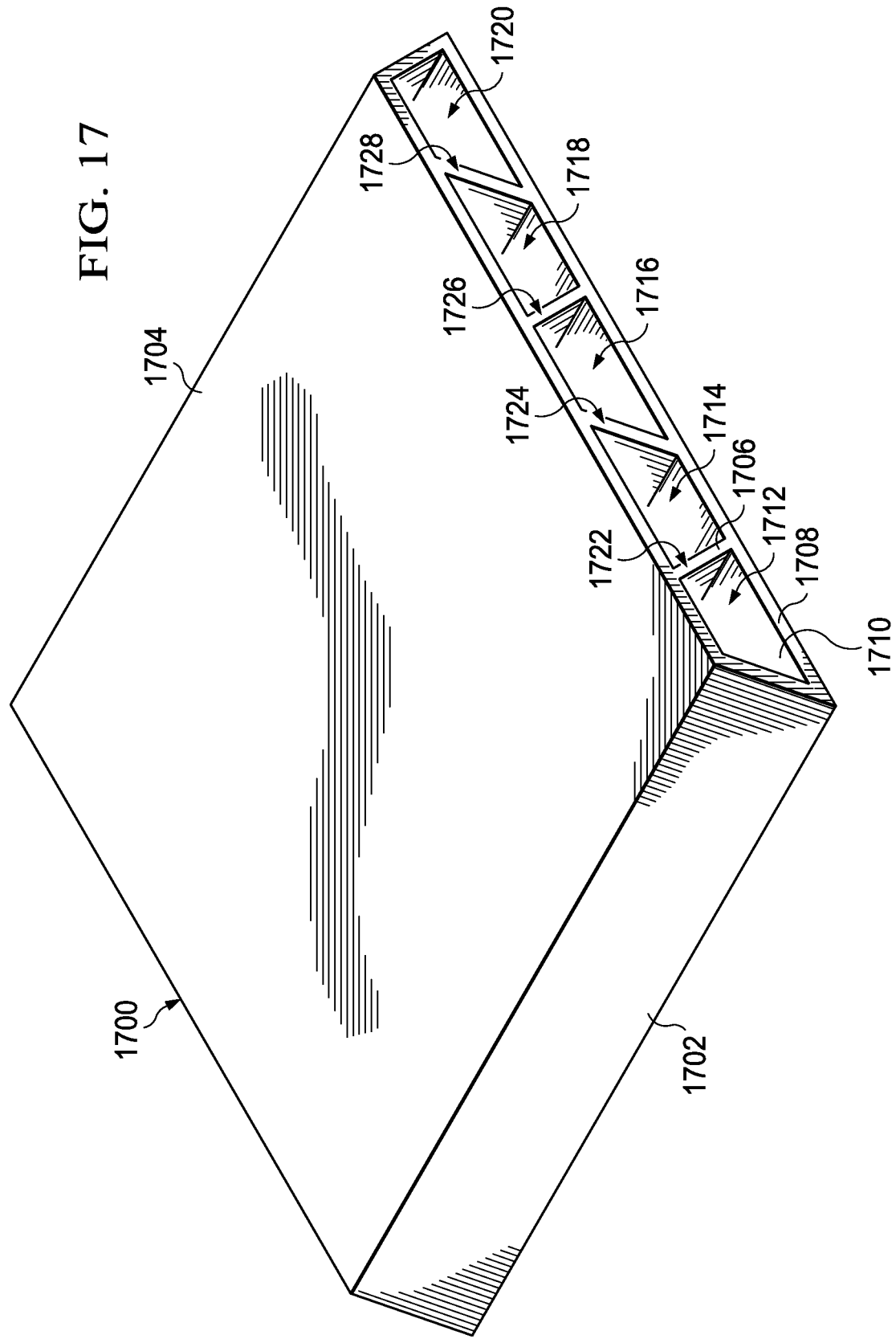
FIG. 17 is an illustration of a composite structure in accordance with an illustrative embodiment.

As yet another example, in FIG. 17, an illustration of a composite structure is depicted in accordance with an illustrative embodiment. In this depicted example, composite structure 1700 takes the form of floor panel 1702. As can be seen, floor panel 1702 comprises composite material 1704, filler material 1706, and barrier material 1708. In these examples, barrier material 1708 is associated with walls 1710 for channels 1712, 1714, 1716, 1718, and 1720. As can be seen in this example, barrier material 1708 may contact composite material 1704 or filler material 1706. In these examples, filler material 1706 is present in sections 1722, 1724, 1726, and 1728.

Figure 18:
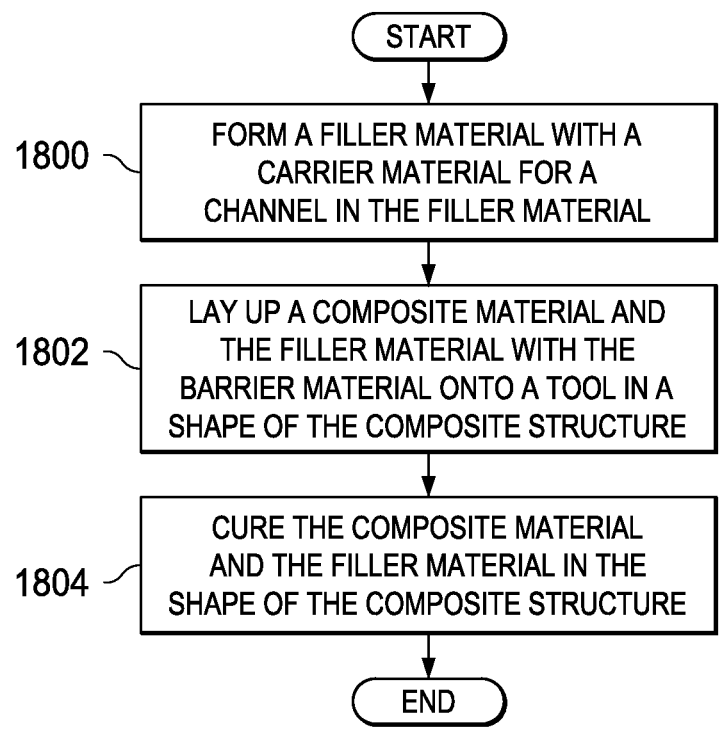
FIG. 18 is an illustration of a flowchart of a process for forming a composite structure in accordance with an illustrative embodiment.

Turning now to FIG. 18, an illustration of a flowchart of a process for forming a composite structure is depicted in accordance with an illustrative embodiment. The process illustrated in FIG. 18 may be implemented using tools illustrated in FIG. 4.

The process begins by forming a filler material with a barrier material for a channel in the filler material (operation 1800). The process then lays up a composite material and the filler material with the barrier material onto a tool in a shape of the composite structure (operation 1802). Next, the process cures the composite material and the filler material in the shape of the composite structure (operation 1804), with the process terminating thereafter.

Figure 19:
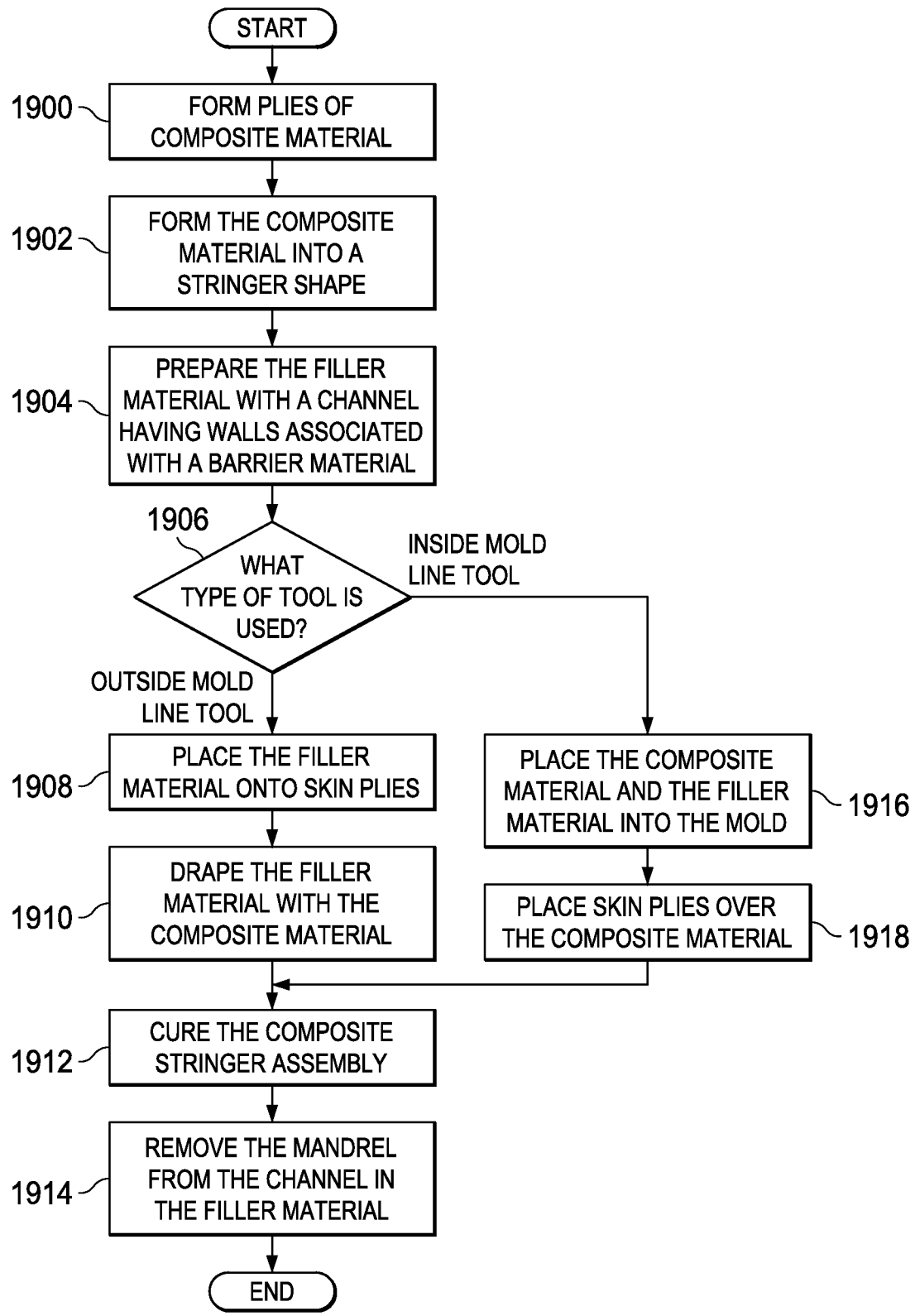
FIG. 19 is an illustration of a flowchart of a process for manufacturing a composite structure having a filler material with a channel associated with a barrier material in accordance with an illustrative embodiment.

Turning now to FIG. 19, an illustration of a flowchart of a process for manufacturing a composite structure having a filler material with a channel associated with a barrier material is depicted in accordance with an illustrative embodiment. The process illustrated in FIG. 19 may be implemented using tools shown in FIG. 4. In particular, this process may be used to manufacture a composite stringer, such as composite stringer 500 in FIG. 5 or composite stringer 600 in FIG. 6, using the components illustrated in FIG. 4.

The process begins by forming plies of composite material (operation 1900). This operation may involve cutting plies of composite tape and/or fabric, stacking the plies together, and vacuum compacting the composite material to form a flat charge. Thereafter, the composite material is formed into a stringer shape (operation 1902). Operation 1902 may involve using a die or press to shape the flat charge into a stringer shape.

The process prepares the filler material with a channel having walls associated with a barrier material (operation 1904). In some illustrative embodiments, the walls of the channel may in part be formed by the composite material. In other illustrative embodiments, the walls may be located entirely within the filler material. A removable mandrel is installed into the channel in the filler material in operation 1904. In other instances, the filler material and the barrier material may be formed around the mandrel.

Next, a determination of the type of tool used is made (operation 1906). If the tool is an outside mold line tool, the process places the filler material onto skin plies (operation 1908). Thereafter, the filler material is draped with the composite material (operation 1910).

The process cures the composite stringer assembly (operation 1912). This curing operation also may include compacting the assembly with a vacuum in the oven. The process then removes the mandrel from the channel in the filler material (operation 1914), with the process terminating thereafter.

With reference again to operation 1906, if the type of tool is an inside mold line tool, the process places the composite material and the filler material into the mold (operation 1916). Next, the process places skin plies over the composite material (operation 1918), with the process proceeding to operation 1912 as described above.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. In addition, operations not shown may be included.

For example, operation 1800 and 1802 in FIG. 18 may be interchangeable in terms of order in which the operations are performed. For example, the filler material may be formed first with the composite structure being formed around the filler material afterwards. In other illustrative embodiments, the composite structure may be formed first, and the filler material may be placed into the composite structure. The creation of the number of channels may be performed in a number of different ways. For example, a mandrel may be used for each channel within the number of channels. In other illustrative embodiments, a channel may be formed at a later point in time after the composite part has been cured.

Thus, the different illustrative embodiments provide a method and apparatus for manufacturing composite structures. These composite structures have multiple functions. With the different illustrative embodiments, a need for fittings may be reduced or eliminated in aircraft. Further, through the use of the different illustrative embodiments, increased impact resistance may be present. This increased impact resistance may be present by isolating the systems within channels in the composite structures.

As a result, exposed wires, conduits, and other systems may be reduced or avoided. Further, the filler material may provide a capability to provide acoustical and vibrational isolation. Through the use of barrier materials within channels, moisture infiltration into the systems may be reduced. Also, the barrier materials may be selected to allow for the channels to carry fluids. Also, these channels may act as air returns. In some illustrative embodiments, multiple channels may be present within a composite structure.

Also, the different illustrative embodiments may reduce the time needed to fabricate aircraft. For example, the channels may be co-cured as part of the composite structure. For example, the channels may be formed in the composite structure in a single step or at the same time. As a result, secondary fastening of cables, harnesses, conduits, and other structures may be avoided. Also, less drilling is required in the composite structures with the different illustrative embodiments. In this manner, the composite structures may need less design changes to accommodate for holes. Further, reduced installation time is needed because fewer fittings are needed to secure parts.

The description of the different illustrative embodiments has been presented for purposes of illustration and description, and it is not intended to be exhaustive or limited to the embodiments in the form disclosed. Many modifications and variations will be apparent to those of ordinary skill in the art.

Although, in the depicted examples, the different illustrative embodiments are described with respect to an aircraft, the different illustrative embodiments recognize that some illustrative embodiments may be applied to other vehicles other than aircraft such as, for example, without limitation, a submarine, a personnel carrier, a tank, a train, a bus, a spacecraft, a surface ship, and/or other suitable vehicles.

Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A structure comprising:
  a composite structure configured for use in or on an aircraft, the composite structure selected from the group consisting of: a stringer of the aircraft, a floor panel of the aircraft, a cryogenic tank installed on the aircraft, a spar of the aircraft, and a rib of the aircraft;
  a filler material disposed within and abutting all first inner walls of the composite structure;
  a first barrier material secured to second inner walls of the filler material, the second inner walls being further within the composite structure relative to the first inner walls, and third inner walls of the first barrier material defining a first channel inside the composite structure; and a second barrier material secured to fourth inner walls of the filler material, the fourth inner walls being further within the composite structure relative to the first inner walls, and fifth inner walls of the second barrier material defining a second channel inside the composite structure; wherein at least one of a number of fiber optic cables, a number of power lines, a number of wires, and a number of data lines is located in one of the first channel and the second channel.

2. The structure of claim 1 further comprising:

a number of additional sets of inner walls within the filler material; and corresponding additional sets of barrier materials being secured to corresponding ones of each of the additional sets of inner walls, wherein corresponding additional channels are defined within the corresponding additional sets of barrier materials.

3. The structure of claim 1, wherein the other of the first channel and the second channel forms a waveguide.

4. The structure of claim 1, wherein the other of the first channel and the second channel is configured to receive a liquid, air, or a gas.

5. The structure of claim 1, wherein the first and second barrier materials are selected from the group consisting of a metal, copper, aluminum, titanium, a plastic, and polyvinyl chloride.

6. The structure of claim 1, wherein the filler material is selected from the group consisting of a foam, fiberglass, a honeycomb structure, a vibration reduction material, an insulation material, and wood.

7. The structure of claim 1, wherein the other of the first channel and the second channel is part of a system selected from the group consisting of an air duct and a fire suppression system.

8. The structure of claim 1, wherein the composite structure comprises the stringer and wherein the composite structure is further configured for both stiffening the aircraft and media transport within the stringer.

9. The structure of claim 1, wherein the filler material further separates the first channel from the second channel.

10. The structure of claim 1, wherein the composite structure comprises a trapezoid shape, and wherein the first barrier material, the second barrier material, and the filler material form an I-beam and sides configuration.

11. A structure comprising:

a composite structure configured for use in or on an aircraft, the composite structure selected from the group consisting of: a stringer of the aircraft, a floor panel of the aircraft, a cryogenic tank installed on the aircraft, a spar of the aircraft, and a rib of the aircraft, wherein the composite structure has a first trapezoid shape;

a filler material disposed within and abutting all first inner walls of the composite structure, wherein the filler material has a second trapezoid shape; and a barrier material secured to second inner walls of the filler material, the second inner walls being further within the composite structure relative to the first inner walls, and third inner walls of the barrier material defining a first channel inside the composite structure, wherein the barrier material has a third trapezoid shape; wherein at least one of a number of fiber optic cables, a number of power lines, a number of wires, and a number of data lines is located in the first channel.

12. A structure comprising:

a composite structure configured for use in or on an aircraft, the composite structure selected from the group consisting of: a stringer of the aircraft, a floor panel of the aircraft, a cryogenic tank installed on the aircraft, a spar of the aircraft, and a rib of the aircraft, the composite structure having disposed therein a filler material and a barrier material, a channel being defined inside the barrier material, the filler material disposed only on one side of the barrier material, the filler material abutting the barrier material and outside the channel, wherein at least one of a number of fiber optic cables, a number of power lines, a number of wires, and a number of data lines is located in the channel.

13. The structure of claim 12, wherein the barrier material and the channel are configured to receive air, or a gas.

14. The structure of claim 12, wherein the barrier material is selected from the group consisting of a metal, copper, aluminum, titanium, a plastic, and polyvinyl chloride, and wherein the filler material is selected from the group consisting of a foam, fiberglass, a honeycomb structure, a vibration reduction material, an insulation material, and wood.

15. The structure of claim 12 wherein the barrier material and the filler material form a top foam configuration.

16. The structure of claim 12, wherein the channel and the barrier material are part of a system selected from the group consisting of an air duct and a fire suppression system.

* * * * *